Feb. 17, 1931. C. REIGART 1,792,928
PIPE OUTLET CONSTRUCTION
Filed July 14, 1925
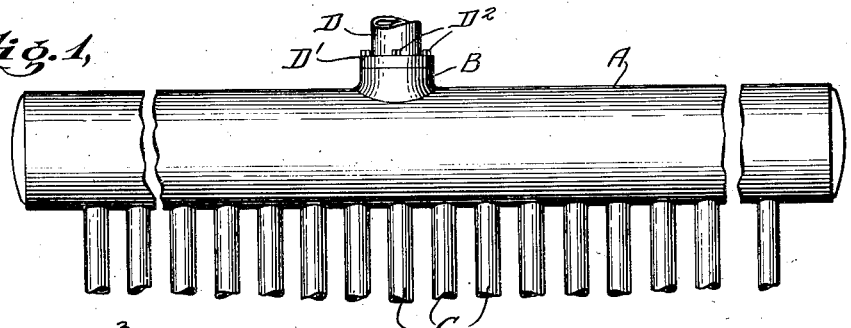
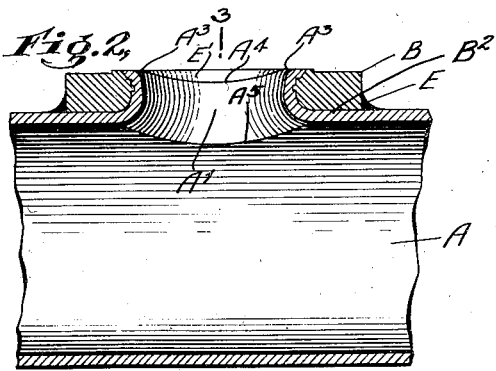
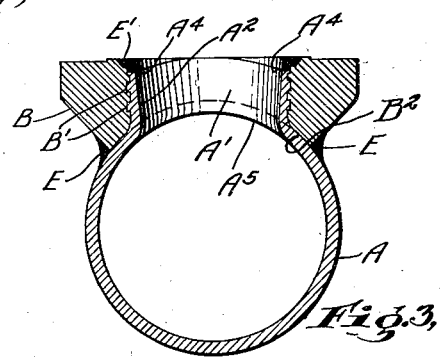
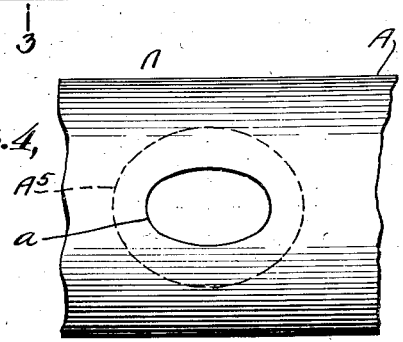
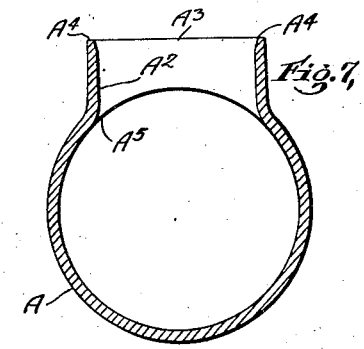
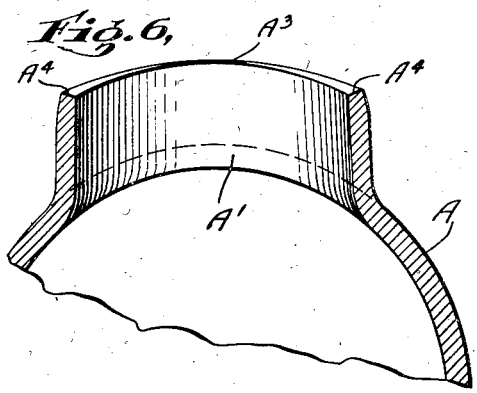
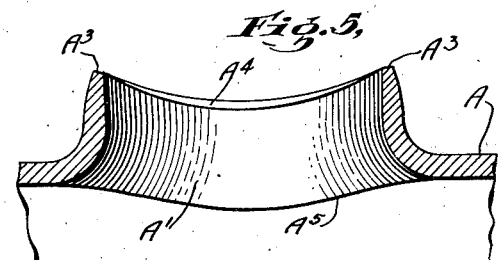
INVENTOR
Chauncey Reigart
BY
John E. Hubbell
ATTORNEY Patented Feb. 17, 1931

1,792,928

UNITED STATES PATENT OFFICE

CHAUNCEY REIGART, OF DANSVILLE, NEW YORK, ASSIGNOR TO FOSTER WHEELER CORPORATION, OF NEW YORK, N. Y., A CORPORATION OF NEW YORK

PIPE-OUTLET CONSTRUCTION

Application filed July 14, 1925. Serial No. 43,463.

The general object of the present invention is to provide a metal pipe with a lateral outlet or "nozzle" by which a second transversely extending pipe may be connected to the first pipe. More specifically, the object of the present invention is to provide a pipe such as a superheater or boiler head, or the like, subjected to relatively high internal pressures with a so-called "nozzle" or outlet of novel and desirable characteristics.

The various features of novelty which characterize my invention are pointed out with particularity in the claims annexed to and forming a part of this specification. For a better understanding of the invention, however, its advantages and specific objects attained with it, reference should be had to the accompanying drawings and descriptive matter in which I have illustrated and described a preferred form of my invention.

Of the drawings:

Fig. 1 is an elevation;

Fig. 2 is an elevation in section of a portion of the apparatus shown in Fig. 1;

Fig. 3 is a section on the line 3—3 of Fig. 2;

Fig. 4 is a plan view of a header in process of being provided with the improved outlet construction;

Figs. 5 and 6 are sections at right angles to one another illustrating a conduit in a second intermediate stage of its treatment to provide for the improved outlet construction; and Fig. 7 is a view taken similarly to Fig. 6 illustrating a modified condition.

In the drawings, A represents a wrought metal header pipe ordinarily of steel, and having a lateral outlet formed in accordance with the present invention, for the attachment to the header A of a transversely extending pipe D for supplying to, or withdrawing from the header the fluid passing through the latter to, or from the tubes C which may be connected to the header in the usual manner.

The header outlet is formed by an extruded cylindrical portion or tubular neck A' of the body of the header A which is expanded into the bore of a cast or forged metal collar B. The latter is shaped to provide a saddle seat fitting against the cylindrical outer wall of the header A. Preferably, and as shown, the bore of the collar B is provided with circumferential grooves B' into which the extruded portion A' of the header A is forced when said portion is expanded into place in the collar B. To avoid all possibility of leakage along the joint between the collar B and the header A, the parts may be welded together at the margins of the joint as indicated at E and E'. This welding is not required, however, to add strength to the nozzle connection since with the described construction the strength of the nozzle outlet is ordinarily at least as great as the strength of the header itself. The flanged end D' of the lateral pipe D may be secured to the collar B by stud bolts $D^2$.

In the preferred practical mode of forming the outlet construction of Figs. 1, 2, and 3, a hole $a$ is first punched or drilled in the wall of the header A at the proper place and this hole is then enlarged by expanding the metal between the margin of the hole $a$ and the margin $A^5$ of the inner end of the finished nozzle or outlet A'. The expansion of the metal may be done in an extrusion press of known type. The extrusion process, in general, results in giving the header outlet portion the general form shown in Figs. 5 and 6. It will be observed from the drawings, and particularly from Figs. 5 and 6, that the thickness of the wall of the tubular neck extruded from the header is not diminished appreciably adjacent the junction between the neck and the header, so that, as seen in Fig. 3, practically the full thickness of the header metal is maintained up to the point at which a portion of the neck is forced into the inner groove B' formed in the bore of the collar B. The outer portion of the tubular neck is thinned somewhat, but such thinning of the metal does not reduce the effective strength of the connection, particularly as the thinning of the metal is substantially confined to that resulting from the elongation of the metal circumferentially of the neck. There is but little elongation of the metal in the direction of the length of the neck and in the ordinary preferred practice of the invention, the neck is relatively short, its average length being less than half the diameter of the bore of the neck.

The fact that portions of the neck and collar intermediate their ends are expanded into interlocking engagement contributes materially to the strength of the connection. The rigidity of the ring B connected as described to the neck A', contributes to the strength of the connection and also augments the effectiveness of the reinforcement afforded by the collar to the header body A along the line at which the latter is connected to the neck portion A. When the bore of the outlet is considerably smaller than the bore of the header A, the outer end edge of the tubular neck A' will ordinarily be convex at the ends of the diameter of the neck parallel to the axis of the tube A, as indicated at $A^3$, and will be concave, as indicated at $A^4$, at the ends of the diameter transverse to the axis of the header. The extent of such convexity and concavity may be minimized by suitably shaping the opening $a$ punched in the header, and, generally speaking, this opening should be oval or elliptical in form. When the bore of the outlet opening is quite large relative to the bore of the header A, it is possible to so shape the initial opening $a$ that the outer end of the tubular neck in the finished outlet construction will be substantially flush with the outer face of the collar B as shown in Fig. 7.

Having now described my invention, what I claim as new and desire to secure by Letters Patent, is:—

1. A metallic pipe adapted for use with high internal pressures and having a lateral outlet formed by an integral extruded neck projecting radially a relatively short distance from the body of said pipe, said neck having substantially the same wall thickness as said pipe body for a major portion of its length, relatively heavy rigid integrally formed metallic collar adapted to be connected to a second pipe and surrounding said neck, said collar having its bottom surface shaped to circumferentially contact with said pipe body immediately surrounding the inner end of said neck and welded to said pipe body at the margin of said contacting portions, and means providing a direct interlocking connection between said collar and said neck, whereby axial stresses on said collar will be distributed to said neck and surrounding pipe body.

2. A metallic pipe adapted for use with high internal pressures and having a lateral outlet formed by an integral extruded neck projecting radially from the body of said pipe a distance substantially less than the bore of said neck, said neck having substantially the same wall thickness as said pipe body for a major portion of its length, a relatively heavy rigid integrally formed metallic collar adapted to be connected to a second pipe and surrounding said neck, said collar having its bottom surface shaped to circumferentially contact with said pipe body immediately surrounding the inner end of said neck and welded to said body at the margin of said contacting portions, and means providing a direct interlocking connection between said collar and said neck consisting of circumferential grooves in an intermediate portion of the inner wall of said collar and into which a substantially untapered portion of said neck is expanded, whereby axial stresses on said collar will be distributed to said neck and surrounding pipe body.

Signed at Dansville, in the county of Livingston and State of New York, this day of July, 9th A. D. 1925.

CHAUNCEY REIGART.